US012276395B2

(12) United States Patent
Edwards

(10) Patent No.: US 12,276,395 B2
(45) Date of Patent: Apr. 15, 2025

(54) LAMP ASSEMBLY

(71) Applicant: REDWARDS CONSULTANTS LTD, Kent (GB)

(72) Inventor: Robert Edwards, Kent (GB)

(73) Assignee: REDWARDS CONSULTANTS LTD, Kent (GB)

( * ) Notice: Subject to any disclaimer, the term of this patent is extended or adjusted under 35 U.S.C. 154(b) by 0 days.

(21) Appl. No.: 18/832,886

(22) PCT Filed: Dec. 12, 2022

(86) PCT No.: PCT/GB2022/053177

§ 371 (c)(1),
(2) Date: Jul. 24, 2024

(87) PCT Pub. No.: WO2023/111531

PCT Pub. Date: Jun. 22, 2023

(65) Prior Publication Data

US 2025/0035275 A1 Jan. 30, 2025

(30) Foreign Application Priority Data

Dec. 13, 2021 (GB) .................................... 2117946

(51) Int. Cl.
*F21S 6/00* (2006.01)
*F21S 4/24* (2016.01)
(Continued)

(52) U.S. Cl.
CPC ................. *F21S 6/003* (2013.01); *F21S 4/24* (2016.01); *F21V 21/22* (2013.01); *F21V 21/28* (2013.01);
(Continued)

(58) Field of Classification Search
CPC ... F21S 4/24; F21S 6/002; F21S 6/003; F21V 27/00
See application file for complete search history.

(56) References Cited

U.S. PATENT DOCUMENTS 4,706,172 A 11/1987 Lebowitz
10,422,516 B1 9/2019 Lee
(Continued)

FOREIGN PATENT DOCUMENTS

CN 207132159 U 3/2018
CN 209084493 7/2019
(Continued)

OTHER PUBLICATIONS

International Search Report and Written Opinion for PCT/GB2022/053177 mailed on Mar. 21, 2023, 13 pages.
(Continued)

*Primary Examiner* — Alexander K Garlen
(74) *Attorney, Agent, or Firm* — AEON Law, PLLC; Adam L. K. Philipp; Charlotte E. Holoubek

(57) ABSTRACT

A lamp assembly comprises an upstanding post whose lower end is supported by a bae member. A carriage member is supported by and moveable relative to the upstanding post to enable the height of the carriage member above the base member to be varied. A spool which houses a coiled metallic tape of arcuate cross-section is supported by the post and a light source is located at or towards the end of the metallic tape remote from said carriage member.

7 Claims, 2 Drawing Sheets

(51) Int. Cl.
*F21V 21/22* (2006.01)
*F21V 21/28* (2006.01)
*F21V 21/34* (2006.01)
*F21Y 103/10* (2016.01)
*F21Y 115/10* (2016.01)

(52) U.S. Cl.
CPC ........... *F21V 21/34* (2013.01); *F21Y 2103/10* (2016.08); *F21Y 2115/10* (2016.08)

(56) References Cited

U.S. PATENT DOCUMENTS

2015/0092427 A1 4/2015 Nopper
2019/0056094 A1 * 2/2019 Dyson ..................... F21S 6/003

FOREIGN PATENT DOCUMENTS

CN 111059487 A 4/2020
CN 210267013 U 4/2020
CN 116697281 A * 9/2023
CN 116906864 A * 10/2023
DE 2919413 A1 10/1980
DE 3800792 A1 7/1989
DE 29706090 U1 5/1997
DE 20210215 U1 6/2003
KR 20010001351 U 1/2001
KR 20140079015 A 6/2014
WO WO-0179751 A1 * 10/2001 .............. F21S 6/003

OTHER PUBLICATIONS

Examination report for GB Application No. GB2117946.0, dated May 20, 2024, 5 pages.
Search and Examination report for GB Application No. GB2117946.0, dated Aug. 19, 2022, 11 pages.

* cited by examiner

LAMP ASSEMBLY

FIELD OF THE INVENTION

This invention relates to lamp assemblies, particularly free-standing lamp assemblies. More especially, but not exclusively, the invention concerns free-standing lamp assemblies for location on furniture items such as desks and tables (referred to below as "desks" for ease of understanding) and floor-mounted lamp assemblies.

BACKGROUND TO THE INVENTION

Free-standing lamps are known which include some form of telescopic support structure which enables the light source of the lamp to be selectively raised, lowered and/or tilted to assist better inspection of an article positioned on a desk or other item of furniture.

Hitherto, changing the location of such a lamp assembly to enable the projected light beam of the lamp to be more accurately projected onto a particular item under inspection on, for example a desk, can prove to be difficult particularly when the item in question extends over a substantial part of the surface of the furniture item or when other items are present on the furniture item.

In one aspect, the present invention sets out to provide a lamp assembly which alleviates this and other disadvantages of known free-standing lamp assemblies.

SUMMARY OF THE INVENTION

In one aspect the invention provides a lamp assembly which comprises an upstanding post whose lower end is supported by a base, a carriage member supported by and moveable relative to the vertical upstanding post to enable the height of the carriage member above the base member to be varied, a spool housing supported by said carriage member, a coiled metallic tape of arcuate cross-section housed within said spool housing with one end secured to an internal surface of the spool housing and its other end projecting from the spool housing, means for retaining said metallic tape at one of a multiplicity of selected lengths from said cross-sectional housing, and a light source located at or towards the end of the metallic tape remote from said spool housing.

In a preferred embodiment, rollers and tape guides are employed within the spool housing to assist retention of the metallic tape at a selected length from said spool housing.

The upstanding post may be rotatable about its vertical axis relative to the base member.

The upstanding post preferably comprises a pair of spaced post members between which the spool housing is positioned and to which the spool housing is attached.

The width of the metallic tape is preferably between 18 mm and 22 mm and the thickness of the tape is preferably between 0.25 mm and 0.50 mm.

The length of the tape is preferably of the order of 80 cm.

The light source may comprise a single lighting unit positioned at or towards the end of the metallic tape.

Alternatively, there may be an additional light source may comprise a plurality of spaced lighting units which extend over at least a part of the length of the tape.

The or each lighting unit preferably comprises an LED lighting unit.

The upstanding post maybe rotatable about its vertical axis relative to the base.

The upstanding post preferably comprises a pair of spaced post members between which spool housing is positioned and to which the spool housing is attached.

The width of the metallic tape is preferably between 18 mm and 22 mm and the thickness of the tape is preferably between 0.25 mm and 0.50 mm.

The length of the tape is preferably of the order of 80 cm.

The light source may comprise a single lighting unit positioned at or towards the end of the metallic tape.

Alternatively, the light source may comprise a plurality of spaced lighting units which extend over at least a part of the length of the tape.

The or each lighting unit preferably comprises an LED lighting unit.

BRIEF DESCRIPTION OF THE DRAWINGS

The invention will now be described by way of example only with reference to the accompanying diagrammatic drawings, in which.

DETAILED DESCRIPTION OF THE INVENTION

Figure 1:
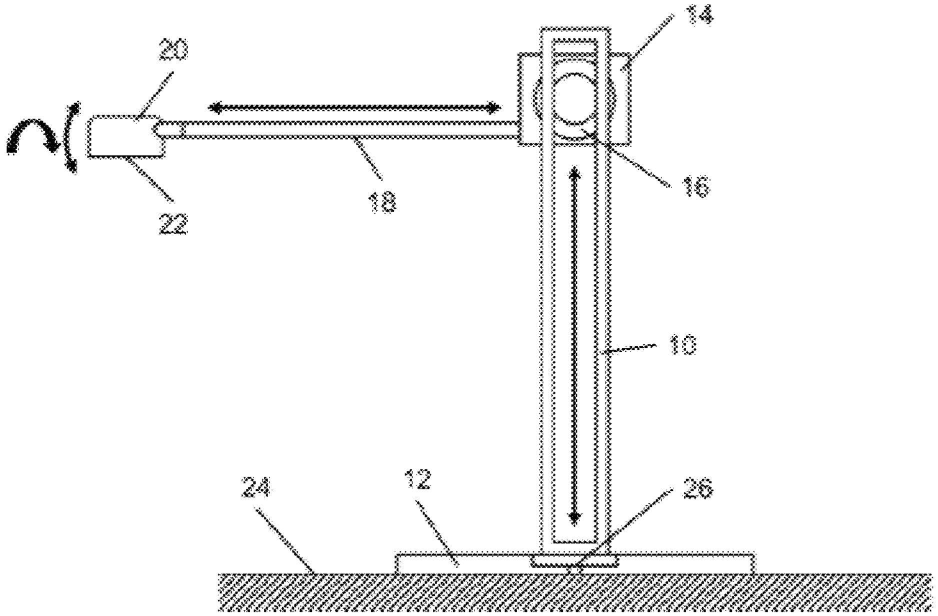
FIG. 1 is a side view of a lamp assembly in accordance with the invention when in use.

The illustrated lamp assembly comprises an upstanding post member 10 which is supported on a base 12 and which, in turn, supports a carriage member 14 which incorporates a spool housing 16.

As illustrated, the post 10 comprises two spaced vertical post members 10*a*, 10*b* positioned one on each side of the carriage member 14.

The post member 10 may be permanently attached to the base or detachable therefrom.

The post member 10 is connected to and supports the carriage member 14.

The carriage member 14 is moveable vertically by hand relative to the post member 10 and can be locked in any selected position along the height of the post by a conventional locking mechanism (not illustrated).

In an alternative embodiment, the carriage member 14 includes a motor able to drive the carriage member vertically along the post member 10 and to retain the carriage member in any selected position.

Located in the spool housing 16 is a retractable coiled metallic tape 18 and a recoil spring which provides a biasing force operable, when required, automatically to recoil and rewind the tape 18 into the housing 16.

As will be apparent from the drawings, the tape is arcuate in cross-section and, when partially or fully deployed, retains its straight-line arcuate shape without bending unless subjected to excessive loading.

Examples of such tape and spool combinations are disclosed, for example, in UK Patents 942729 and 1582223, and U.S. Pat. Nos. 4,153,996 and 5,210,956.

Typically, the width of the metallic tape 18 is between 18 mm and 22 mm and the thickness is typically between 0.25 and 0.50 mm, although other widths and thicknesses may be employed as and when required.

Typically, the overall length of the tape 18 when fully uncoiled is of the order of 80 cm. Other tape lengths may, however, be employed.

The tape 18 is secured at one end to an internal surface or member of the spool housing 16 and is prevented from entering the spool housing at its other end by a platform 20 to which is secured a lighting unit 22.

The lighting unit 22 typically comprises a lightweight LED lamp head although other equivalent lighting units may be employed.

Figure 2:
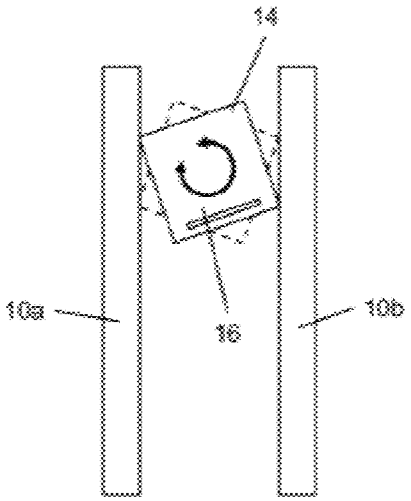
FIGS. 2 and 3 are respectively front and side views of the lamp assembly shown in FIG. 1 illustrating the sideways and vertical angular adjustability of the light source of the assembly.

As illustrated in FIG. 2, the connection between the carriage member 14 and the posts 10*a*, 10*b* enables the lighting unit 22 to be directed either vertically downwardly or at a selected angle to the vertical simply by rotating the carriage member 14 relative to the posts 10*a*, 10*b*.

In this context, it has been established that rotation of the carriage member up to an angle approximating to 80 degrees to the horizontal does not compromise the rigidity of the tape 18.

Preferably, the connection between the carriage member 14 and the posts 10*a*, 10*b* is provided by conventional gimbal or ball and socket connections (not illustrated) to provide easy and diverse movement of the carriage member 14. This connection enables any selected area of the desk surface to be highlighted.

Figure 3:
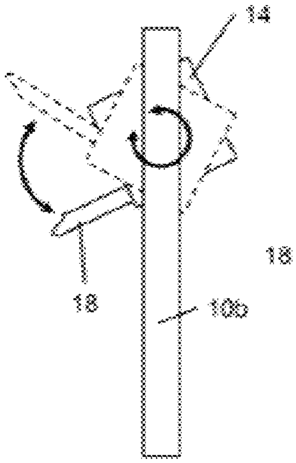

Similarly, as shown in FIG. 3, the connection between the carriage member 14 and the posts 10*a*, 10*b* enables the lighting unit 22 to be directed either vertically downwardly towards the surface 24 of a desk on which the lamp is located or pitched at a selected angle of up to 85 degrees to the horizontal again simply by rotating the tape spool 18 relative to the posts 10*a*, 10*b*.

As will be seen from FIG. 1, the base 12 includes a connection 26 which enables the post 10 to rotate about a vertical axis thereby enabling the light source 22 to be selectively positioned over and/or directed towards any part or area of the desk surface.

Figure 4:
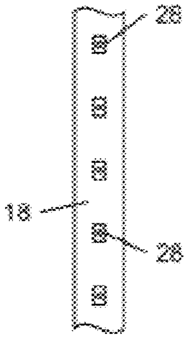
FIG. 4 is a view from above of an alternative lamp assembly in accordance with the invention.
Figure 5:
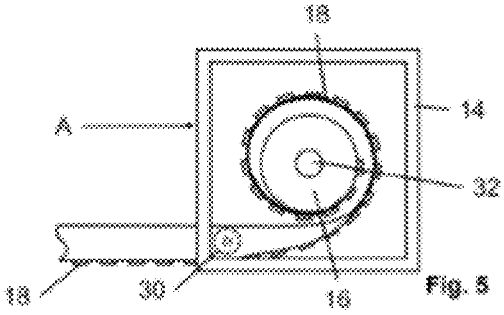
FIG. 5 is a section taken through a spool housing of a lamp assembly in accordance with the invention.
Figure 6:
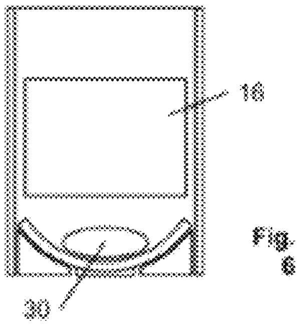
FIG. 6 is a side view of the spool housing illustrated in FIG. 5 taken in the direction of arrow A.
Figure 7:
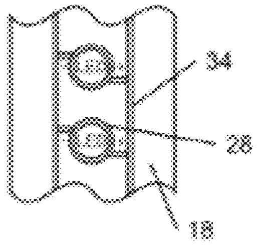
FIGS. 7 and 8 are respectively a plan view from below and a cross sectional view of a metal tape which forms part of the illustrated lamp assembly.
Figure 8:
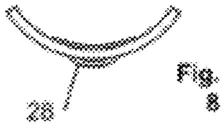

In an alternative arrangement as illustrated in FIG. 4, the tape 18 includes a plurality of individual spaced apart light sources 28.

Turning now to the embodiment of the invention illustrated in FIGS. 5 to 8 (in which like integers to those illustrated in FIGS. 1 to 4 have been given the same reference numerals), a roller 30 is positioned at the entrance to the carriage member 14. This roller, in use, applies a sufficient pressure to the tape 18 to hold the tape in any selected position.

The roller 30 also operates to guide and support the tape as it exits the carriage member 14. In use, the pressure exerted by the roller 30 on the upper surface of the tape 18 is designed to hold the tape in any selected position. The pressure exerted also enables the tape to be further extended or withdrawn fully or partially into the carriage member 14.

This arrangement results in a passive locking mechanism which requires no interaction by a user. Thus, extraction or retraction of the tape can readily be performed by a user using one and selectively to push or pull on the free end of the tape.

The spool hub 32 includes a relatively weak spiral spring (not shown) which acts on the hub and its axle. This spring operates to ensure that the spool hub 32 rotates correctly when the tape 18 is pushed back into the carriage member 14 and that any slack in the metallic tape 18 is gently taken up thereby reducing the risk of jamming. This arrangement ensures that the spiral spring does not adversely resist the tape being pulled from the spool.

As illustrated, a plurality of spaced light sources is positioned along the length of the metallic tape 18. Each light source is bonded to the metallic tape and comprises a lightweight LED unit 28 connected electrically to its neighbouring unit or units through thin film conductive printed connections 34. By so doing, the profile of the metallic tape is relatively thin without disrupting its flexibility to readily bend when wound onto the spool hub 32.

In a preferred arrangement, a microcontroller and associated software is installed within the spool housing 16 to control how, when and which LED units 28 are illuminated. In this way, for example, only LED units located on unspooled lengths of the metallic tape are illuminated, these being automatically switched on as they leave the carriage member 14 and switched off as they enter the carriage member 14.

Alternatively, all LED units 28 may be illuminated at any given time. In such an arrangement, selected sections of the carriage member may be formed of a suitably decorative transparent material to provide an aesthetic feature.

The LED units 28 preferably extend along the entire length of the metallic tape 18; alternatively, they may extend over one or selected lengths of the tape.

The use of a multiplicity of lightweight LED units reduces the mass acting on the tape 18 at any given point thereby improving the overall stability of the lamp assembly and reducing the risk of it bending and/or breaking.

As mentioned previously, spacing of individual LED units 28 along the length of the tape using thin film printed circuitry provides effective flexibility of the tape without affecting its ability to retract and spool up into the spool housing 16.

In use, the metallic tape acts as a heatsink for the LED units.

The presence of a plurality of LED units 28 along the length of the tape 18 provides an enhanced and enlarged illuminated work area.

In use, the carriage member 14 is positioned by a user at a selected height above the base 12 to provide the required level of illumination; the tape 18 is then withdrawn from or retracted into the spool housing 16 to site the light source 22 (or individual light sources 28) above any selected area of the desk surface 24 without the need to relocate the lamp or disturb any papers or other items positioned on the desk.

It will be appreciated that the foregoing is merely exemplary of lamp assemblies in accordance with the invention and that modifications can readily be made thereto without departing from the true scope of the invention as set out in the appended claims.

The invention claimed is:

1. A lamp assembly comprising:

an upstanding post whose lower end is supported by a base member;

a carriage member supported by and moveable relative to the vertical upstanding post to enable the height of the carriage member above the base member to be varied;

means for locking said carriage member at a selected location along the length of the post, a spool supported by said carriage member;

a coiled metallic tape of arcuate cross-section housed within said spool with one end secured to an internal surface of the spool and its other end projecting from the spool;

means for locking said metallic tape at a selected length from said cross-sectional housing; and a light source located at or towards the end of the metallic tape remote from said carriage member.

2. The lamp assembly of claim 1, wherein the upstanding post is rotatable relative to the base member.

3. The lamp assembly of claim 1, wherein the upstanding post comprises a pair of spaced post members between which the spool member is positioned and to which the spool member is attached.

4. The lamp assembly of claim 1, wherein the width of the tape is between 2 mm and 5 mm and the depth of the tape is between 1 mm and 6 mm.

5. The lamp assembly of claim 1, wherein an additional light source comprises a plurality of spaced lighting units which extend over at least a part of the length of the tape.

6. The lamp assembly of claim 5 wherein the/or each lighting unit comprises an LED lighting unit.

7. The lamp assembly of claim 3 wherein the upstanding post is rotatable about its vertical axis relative to the base member.

* * * * *